United States Patent
Kim

[11] Patent Number: 5,769,178
[45] Date of Patent: Jun. 23, 1998

[54] POWER STEERING SYSTEM FOR VEHICLE

[75] Inventor: Jong Bum Kim, Kyungsangam-do, Rep. of Korea

[73] Assignee: Hyundai Motor Company, Seoul, Rep. of Korea

[21] Appl. No.: 632,467
[22] PCT Filed: Sep. 30, 1994
[86] PCT No.: PCT/KR94/00131
  § 371 Date: May 23, 1996
  § 102(e) Date: May 23, 1996
[87] PCT Pub. No.: WO96/10512
  PCT Pub. Date: Apr. 11, 1996
[51] Int. Cl.$^6$ ................................... B62D 5/083
[52] U.S. Cl. .................. 180/403; 180/429; 91/375 A
[58] Field of Search ................... 180/402, 403, 180/417, 429; 91/375 A

[56] References Cited

U.S. PATENT DOCUMENTS

| | | |
|---|---|---|
| 3,452,543 | 7/1969 | Goff et al. . |
| 3,583,517 | 6/1971 | Pensa ........................................ 180/403 |
| 3,724,585 | 4/1973 | Conrad ..................................... 180/403 |
| 3,991,846 | 11/1976 | Chichester et al. ...................... 180/403 |
| 4,798,256 | 1/1989 | Fassbender ............................... 180/403 |
| 5,048,630 | 9/1991 | Schaffer .................................. 91/375 A |

FOREIGN PATENT DOCUMENTS

| | | |
|---|---|---|
| 91/07304 | 5/1991 | WIPO . |
| 93/24355 | 12/1993 | WIPO . |

*Primary Examiner*—Dean Kramer

[57] ABSTRACT

The power steering system for a vehicle includes a steering wheel, a torsion bar fixed to the steering wheel to rotate therewith, a hydraulic control unit for controlling hydraulic pressure generating from an oil pump in accordance with the rotation of the torsion bar, the hydraulic control unit being mounted around the torsion bar, and a power cylinder separated from the torsion bar and receiving the hydraulic pressure from the hydraulic control unit, the power cylinder having a piston meshed with a sector gear which is connected with a pitman arm.

15 Claims, 10 Drawing Sheets

POWER STEERING SYSTEM FOR VEHICLE

BACKGROUND OF THE INVENTION

1. Field of the Invention

The present invention relates to a power steering system for a vehicle and, more particularly, to a power steering system which can adjust the position of wheels of the vehicle by means of only hydraulic pressure without a steering shaft thereby enlarging a space for a driver.

2. Description of Related Art

Generally, in case of using low pressure tires, since adhesion force of steerable wheels is increased, a large force for handling the steering wheel is required to steer the vehicle rapidly. In recent years, since a front wheel drive car and a wide width tire have become quite popular, the power steering system is used to accomplish the rapid steering operation and to provide the low handling force.

The power steering system is designed to reduce the force for handling the steering wheel by receiving the hydraulic pressure from an oil pump which is operated by an engine.

In a conventional power steering system, as shown in FIG. 12, a column shaft assembly 102 is supported on a bracket 101 mounted toward a driver's seat and a steering wheel 104 is fixed to a steering shaft 103 which extends from an upper end of the column shaft assembly 102. Further, a power cylinder 105 is connected to a lower end of the steering shaft 103 by means of a universal joint 106 such that the steering force of the steering wheel 104 is transmitted to the power cylinder 105.

The power steering system is designed such that the hydraulic pressure generated from the oil pump is induced to the power cylinder 105. The direction of the hydraulic pressure is changed in accordance with the steering direction, whereby a piston (not shown) within the power cylinder is moved by the hydraulic pressure.

However, in the power steering system, since the mounting angle between the column shaft assembly and the power cylinder should be maintained at a predetermined angle, it is difficult to set a layout of the vehicle.

Particularly, since the column shaft and the universal joint are disposed toward the driver's seat, the space for the driver is reduced. Further, a plurality of supporting members should be used for fixing the column shaft assembly which increase the manufacturing cost.

SUMMARY OF THE INVENTION

Therefore, the present invention has been made in an effort to solve the above-described problems.

It is an object of the present invention to provide a power steering system which can reduce the manufacturing cost and enlarge the space for driver by mounting a hydraulic control unit part and a power cylinder to be separated from each other.

To achieve the above object, the present invention provides a power steering system for a vehicle comprising a steering wheel; a torsion bar fixed to the steering wheel to rotate therewith; a hydraulic control unit for controlling hydraulic pressure generating from an oil pump in response to the rotation of the torsion bar, the hydraulic control unit being mounted around the torsion bar; and a power cylinder separated from the torsion bar and receiving the hydraulic pressure from the hydraulic control unit, the power cylinder having a piston meshed with a sector gear connected with a pitman arm.

BRIEF DESCRIPTION OF THE DRAWINGS

Further objects and other advantages of the invention will become apparent from the following description in conjunction with the attached drawings, in which.

DETAILED DESCRIPTION OF THE PREFERRED EMBODIMENTS

Figure 1:
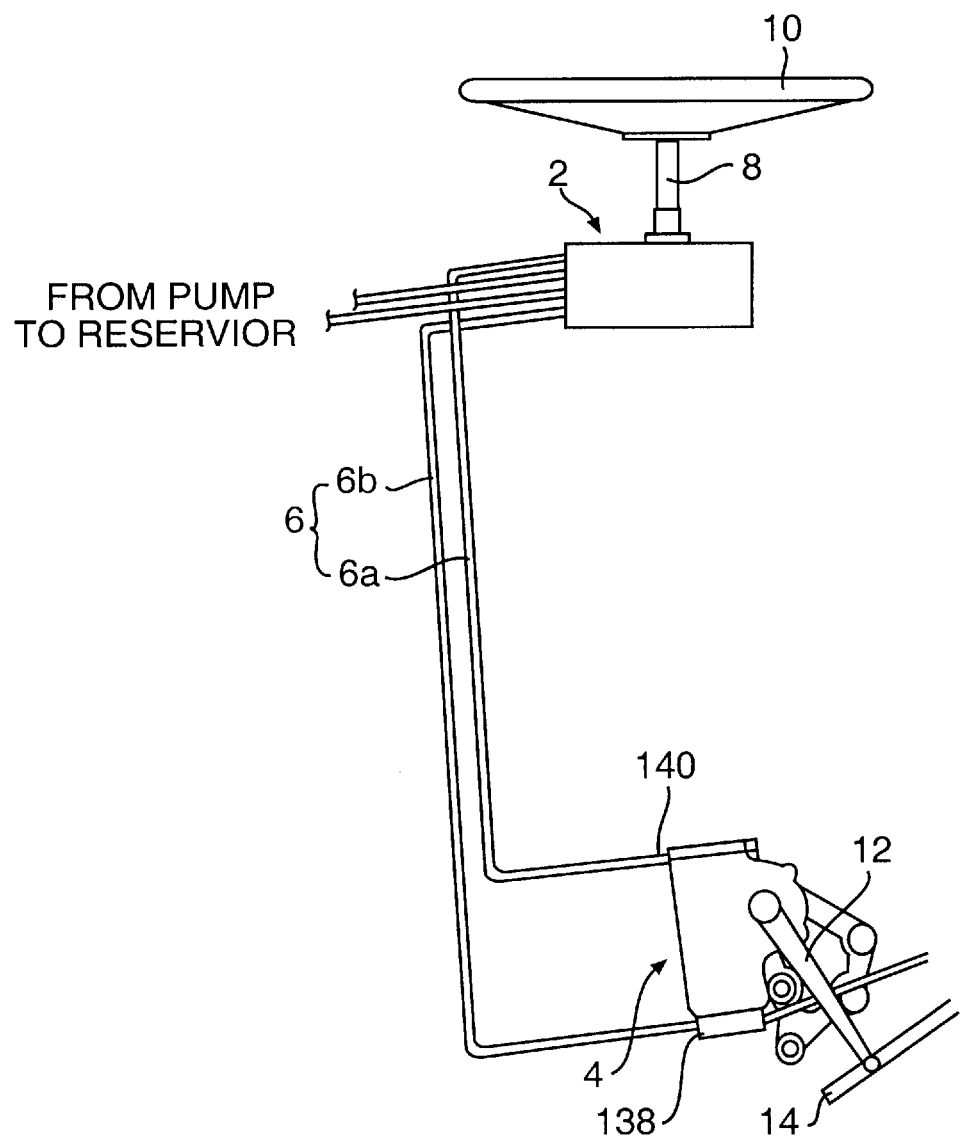
FIG. 1 is a schematic view of a power steering system in accordance with a preferred embodiment of the present invention.

FIG. 1 shows a power steering system in accordance with a preferred embodiment of the present invention. The power steering system is designed such that a hydraulic control unit part 2 and a power cylinder 4 are separated from each other and connected with each other through a fluid tube 6 to actuate the power cylinder with only a hydraulic pressure.

The hydraulic control unit part 2 includes a torsion bar 8 on an upper end of which a steering wheel 10 is mounted. The power cylinder 4 includes a pitman arm 12 which is mechanically connected to a wheel carrier by means of a drag link 14.

Figure 2:
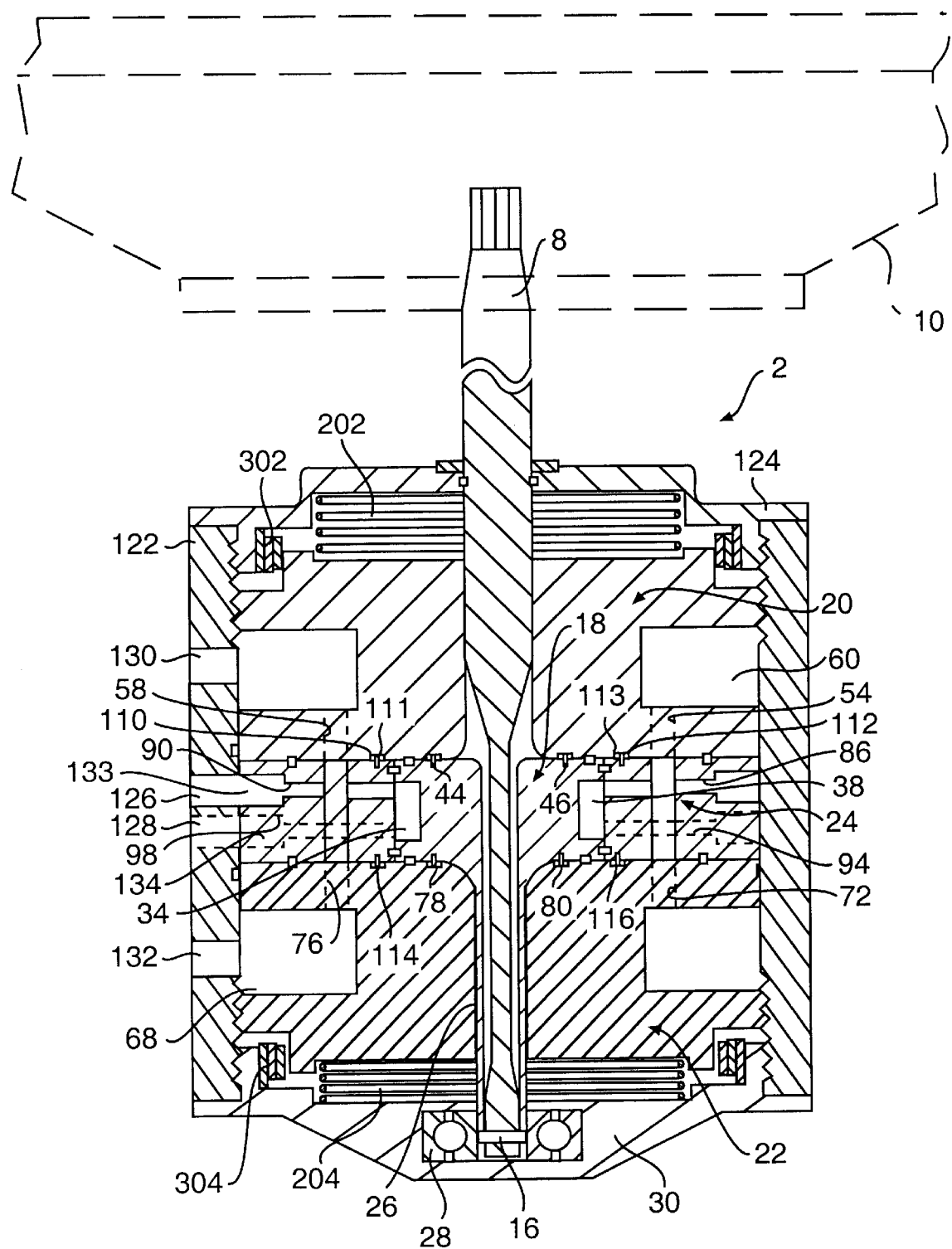
FIG. 2 is a sectional view of a hydraulic control unit of the power steering system in accordance with the preferred embodiment of the present invention.
Figure 3:
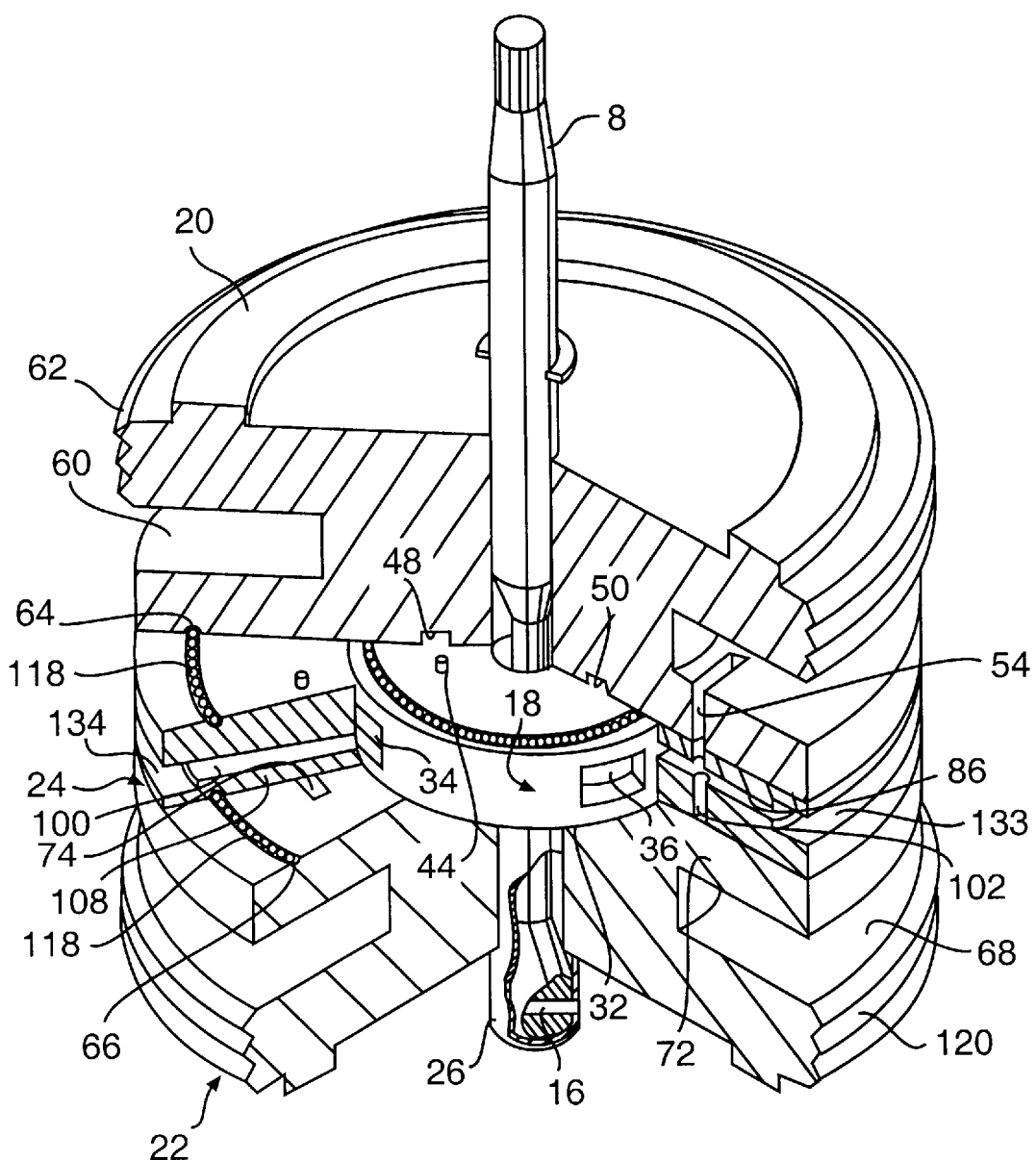
FIG. 3 is a partially cutaway perspective view of a valve assembly for forming the hydraulic control unit in accordance with the preferred embodiment of the present invention.

FIGS. 2 and 3 are a sectional view and a partly cutaway perspective view for illustrating the hydraulic control unit part 2, respectively. The hydraulic control unit part 2 further comprises a first rotating member 18 which is connected to a lower end of the torsion bar 8 by a pin 16 to receive a rotation force of the steering wheel 10, second and third rotating members 20 and 22 which receive the rotation force from the first rotating member 18, and a fourth rotating member 24 which receives the rotation force from the second and third rotation members 20 and 22.

The first rotating member 18 is integrally formed with a cylindrical sleeve 26 in which the torsion bar 8 is inserted. The torsion bar 8 is fixed to a lower end of the sleeve 26 by the pin 16 and a lower end of which is supported to a cap 30 through a bearing 28.

Figure 4:
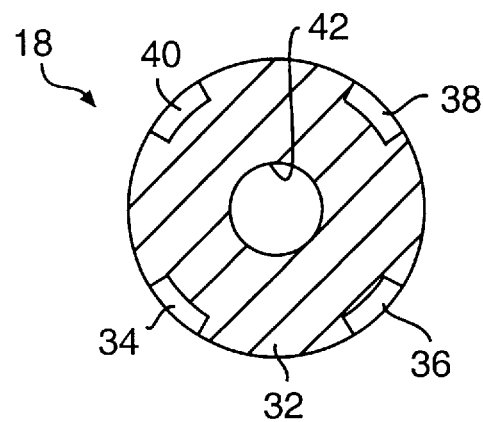
FIG. 4 is a plan view of a first rotating member of the hydraulic control unit in accordance with the preferred embodiment of the present invention.

As shown in FIGS. 2, 3 and 4, the first rotating member 18 includes grooves 34, 36, 38 and 40 formed on its flange 32, a hole 42 formed on its center through which the torsion bar 8 passes, pins 44 and 46 which project from its upper surface, and pins 78 and 80 projecting from its bottom surface.

Figure 5:
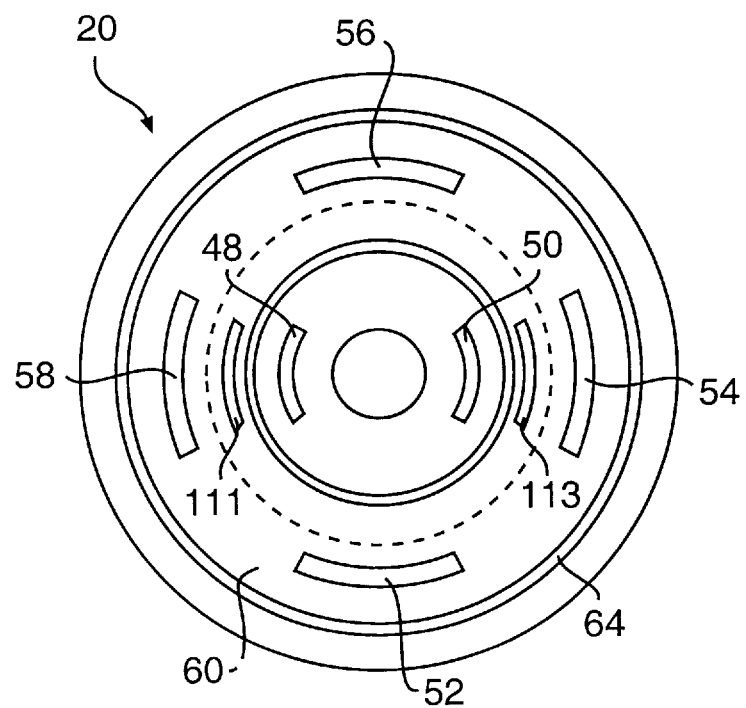
FIG. 5 is a transverse cross section view of a second rotating member of the hydraulic control unit in accordance with the preferred embodiment of the present invention.

As shown in FIGS. 2, 3 and 5, the second rotating member 20 has grooves 48 and 50 formed on its bottom surface to receive the pins 44 and 46, and vertical passages 52, 54, 56 and 58.

The vertical passages 52, 54, 56 and 58 communicate with a channel 60 which is formed along an outer circumferential surface of the second rotating member 20 such that oil can flow therethrough. Further, a screw thread 62 is formed along the outer circumferential surface of the second rotating member 20 and a circumferential groove 64 is formed on the bottom surface of the second rotating member to receive ball members 118.

Figure 6:
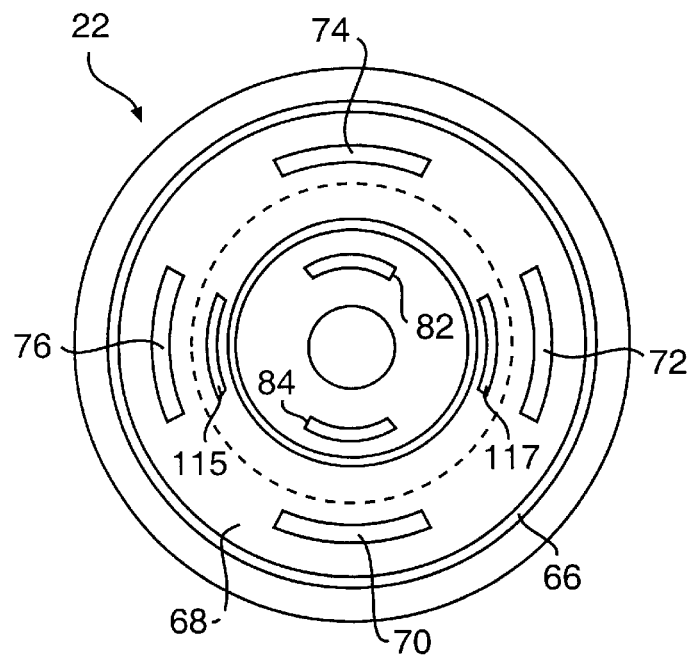
FIG. 6 is a transverse cross section view of a third rotating member of the hydraulic control unit in accordance with the preferred embodiment of the present invention.

The third rotating member 22, as shown in FIGS. 2, 3 and 6, includes a circumferential groove 66, aligned to the circumferential groove 64 of the second rotating member 20 and formed on its upper surface, a channel 68 formed along its outer circumferential surface, and vertical passages 70, 72, 74, and 76 communicating with the channel 68.

Further, the third rotating member 22 is provided with grooves 82 and 84 having a predetermined length to receive pins 78 and 80 which are formed on the bottom surface of the first rotating member 18.

Figure 9A:
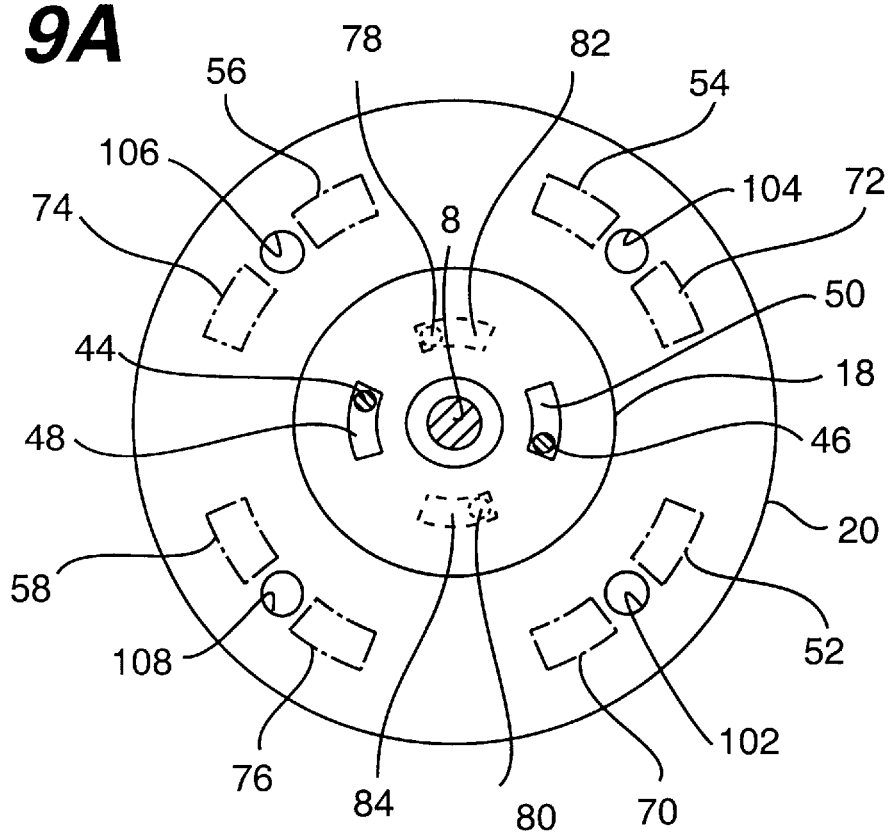
FIG. 9A is a view for illustrating operation of the power steering system in accordance with the present invention.

When the steerable wheels are in a straight position longitudinally aligned with the vehicle body, the pins 44 and 46 which are received in the grooves 48 and 50 and the pins 78 and 80 which are received in the grooves 82 and 84 are displaced as shown in FIG. 9A.

Figure 7A:
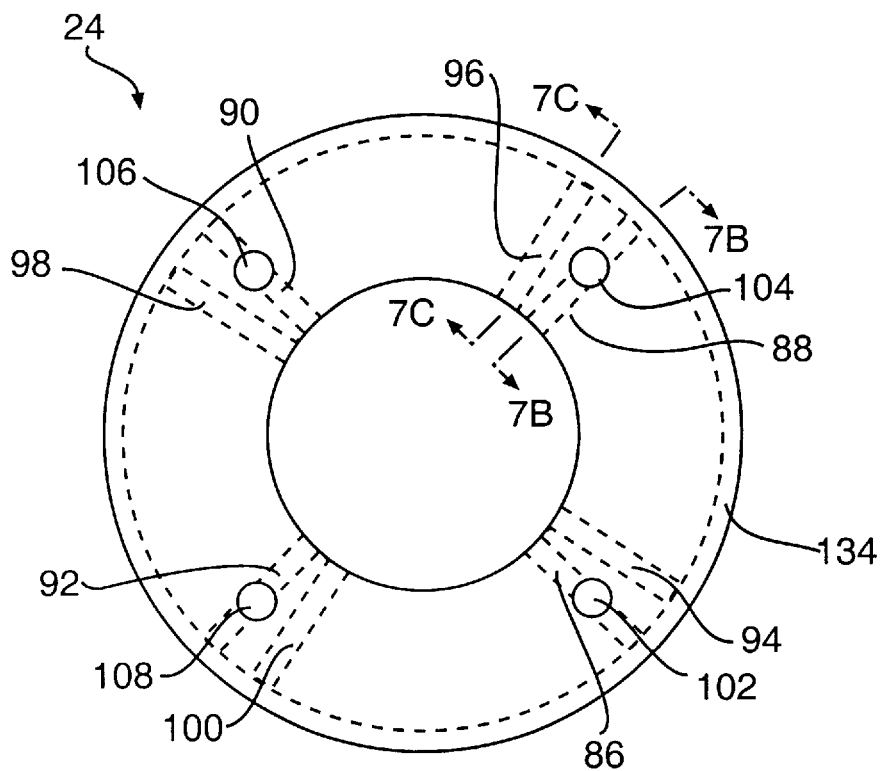
FIG. 7A is a plan view for showing the second rotating member.
Figure 7B:
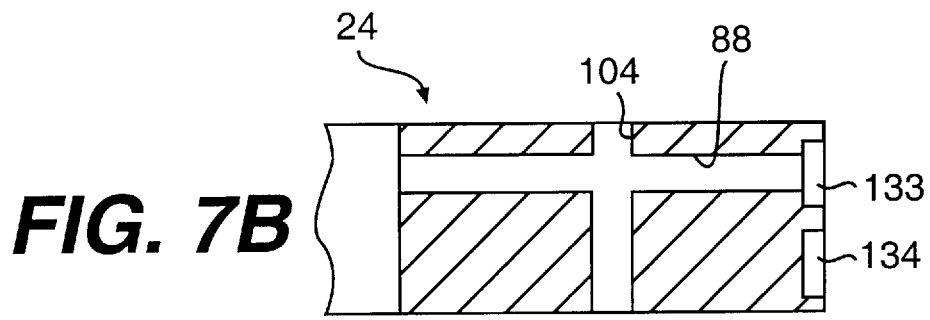
FIG. 7B is a sectional view taken along lines 7B—7B of FIG. 7A.
Figure 7C:
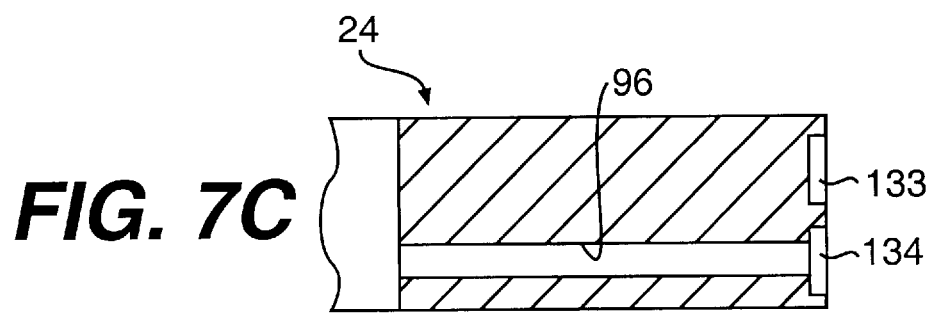
FIG. 7C is a sectional view taken along lines 7C—7C of FIG. 7A.

As shown in FIGS. 7A to 7C, the fourth rotating member 24 includes upper horizontal passages 86, 88, 90 and 92 and lower horizontal passages 94, 96, 98 and 100, all of which can selectively communicate with the grooves 34, 36, 38 and 40 of the first rotating member.

The upper horizontal passages 86, 88, 90 and 92 communicate with an oil pump (not shown) to receive the oil required for steering. The lower horizontal passages 94, 96, 98 and 100 are passages for returning the oil to a reservoir tank (not shown).

Figure 9B:
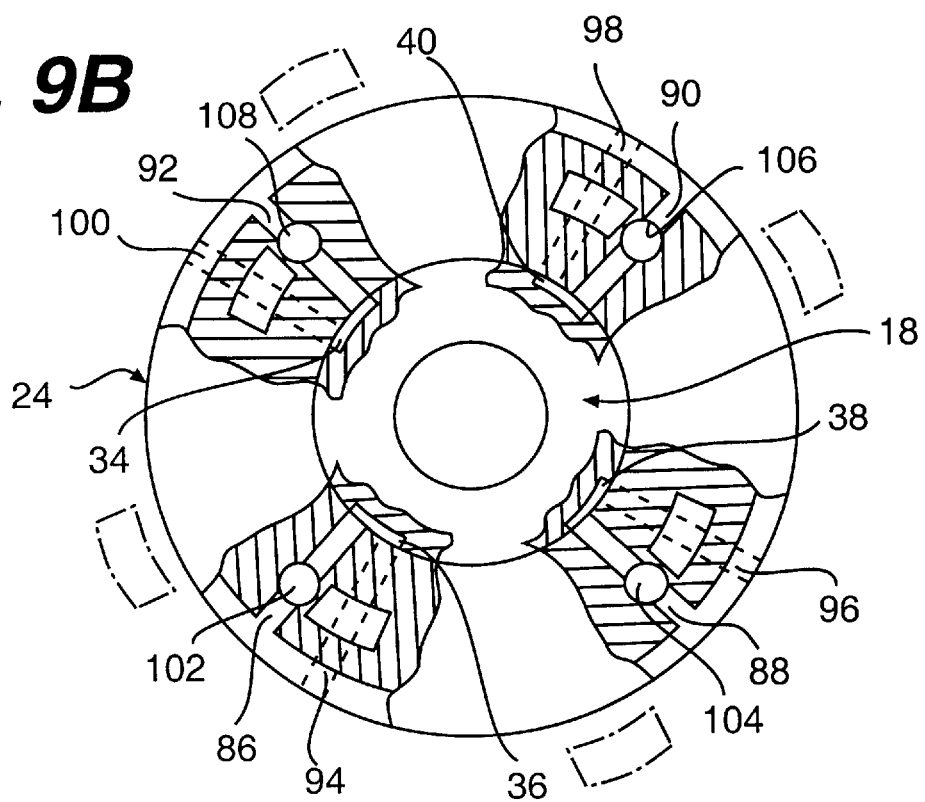
FIG. 9B is a view for illustrating formation of the hydraulic passage in response to the rotation of the rotating members.

The upper and lower horizontal passages are angularly offset from each other along the circumference when viewed from the plan view as shown in FIG. 9B. However, in a straight ahead position, each inner end of the upper and lower horizontal passages communicates with the grooves 34, 36, 38 and 40 of the first rotating member 18 such that the oil generated from the oil pump flows into the upper horizontal passages 86, 88, 90 and 92 and then flows out to the lower horizontal passages 94, 96, 98 and 100 via the grooves 34, 36, 38 and 40, respectively.

Further, the fourth rotating member 24 has vertical passages 102, 104, 106 and 108 which communicate with the vertical passages 52, 54, 56 and 58 of the second rotating member and the vertical passages 70, 72, 74 and 76 of the third rotating member.

Pins 110 and 112 are formed on an upper surface of the fourth rotating member 24 and are located in grooves 111 and 113 formed on a bottom surface of the second member, respectively. Further, pins 114 and 116 are formed on a bottom surface of the fourth rotating member and are located in grooves 115 and 117 formed on an upper surface of the third rotating member, respectively.

Ball members 118 are provided between the faces of the first, second, third and fourth rotating members 18, 20, 22 and 24 to aid smooth rotation. A screw thread 120 is formed on an outer circumferential surface of the third rotating member 22.

As shown in FIG. 2, the lower cap 30 is screw coupled to the lower portion of the cylinder 122. An upper cap 124 is also coupled to the upper portion of the cylinder 122. The first, second, third and fourth rotation members are disposed between the upper and lower caps 30 and 124 and the second and third rotating members are screw coupled to an inner circumferential surface of the cylinder 122.

The cylinder 122 is provided with holes 126 and 128 formed on its one side and holes 130 and 132 which communicate with the channel 60 of the second rotating member and the channel 68 of the third rotating member, respectively.

In order to communicate with upper and lower horizontal passages of the fourth rotating member 24 with the holes 126 and 128 of the cylinder 122, respectively, channels 133 and 134 are formed along the outer circumferential surfaces of the upper and lower horizontal passages of the fourth rotating member 24.

Figure 8:
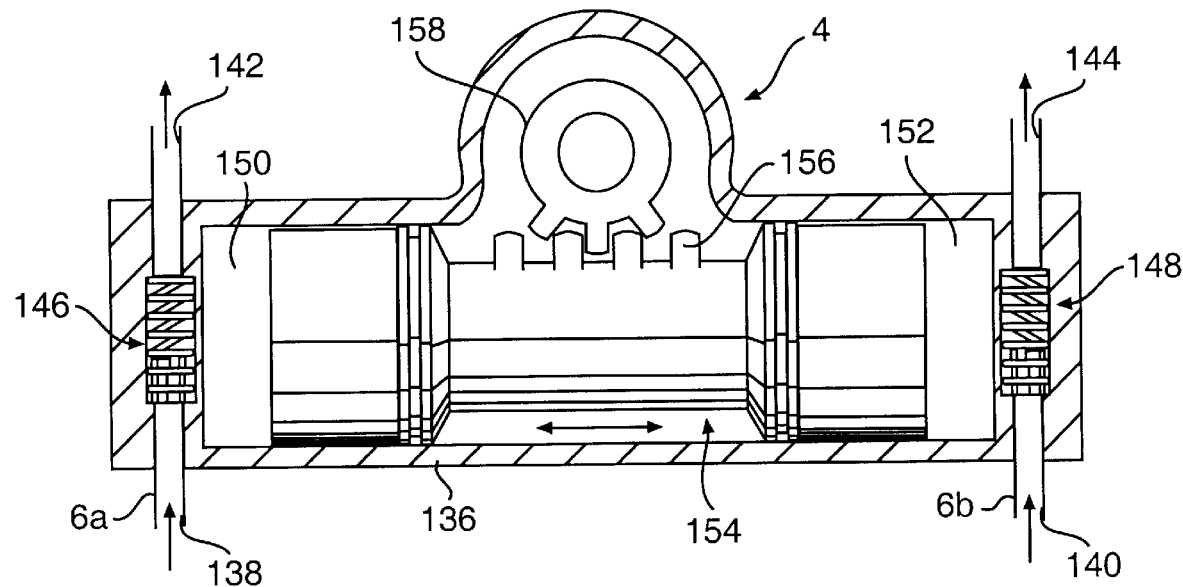
FIG. 8 is a side sectional view of a power cylinder in accordance with the preferred embodiment of the present invention.

FIG. 8 is a side sectional view for illustrating a power cylinder 4 of the present invention. The power cylinder includes a housing 136. The housing 136 is provided with intake ports 138 and 140 connected with fluid tubes 6a and 6b, respectively, and exhaust ports 142 and 144 opposite to intake ports 138 and 140, respectively.

Check valves 146 and 148 are mounted between the ports 138 and 142 and the ports 140 and 144, respectively, to supply the oil to the chambers 150 and 152 or exhaust the oil from the chambers 150 and 152.

A piston 154 is mounted in the housing 136 such that when the oil flows into one of the chambers 150 and 152, the piston 154 can move in a direction. A rack gear 156 is integrally formed on the piston and in mesh with a sector gear 158 coupled with the pitman arm 12.

In the power steering system as described above, when the steering wheel 10 is in a neutral position, the hydraulic control unit part 2 maintains its state as shown in FIGS. 2, 9A and 9B.

The grooves 34, 36, 38 and 40 of the first rotating member 18 are disposed to communicate with the upper and lower horizontal passages of the fourth rotating member 24.

Accordingly, the oil transmitted from the oil pump during the engine operation flows into the hole 126 of the cylinder 122 and then is supplied to the channel 133 of the fourth rotating member 24 thereby flowing along the upper horizontal passages 86, 88, 90 and 92.

By this flow, the oil flows into the grooves 34, 36, 38 and 40 of the first rotating member 18 and, at this point, since the grooves 34, 36, 38 and 40 communicate with the lower horizontal passages 94, 96, 98 and 100, the oil returns to the reservoir tank through the holes 128 of the cylinder 122.

At this point, as shown in FIGS. 9A and 9B, the pins 44 and 46 fixed on the first rotating member 18 are to be located in the grooves 48 and 50 of the second rotating member 20 and are designed to rotate the second rotating member 20 in the clockwise direction if the first rotating member rotates in the clockwise direction. And, the pins 78 and 80 fixed on the bottom surface of the first rotating member 18 and located in the grooves 82 and 84 of the third rotating member 22, respectively, are designed to rotate the third rotating member in the counter-clockwise direction if the first rotating member 18 rotates in the counter-clockwise direction.

In this state, when turning the steering wheel to the right, the torsion bar 8 fixed to the steering wheel rotates therewith to rotate the first rotating member 18.

As a result, the pins 44 and 46 of the first rotating member 18 rotate the second rotating member 20 and, at this point, the pins 78 and 80 received in the grooves 82 and 84, respectively, cannot rotate the third rotating member 22 until the pins 78 and 80 contact one side of each groove. Therefore, from the moment each pin 78 and 80 contacts the one side of each groove, the third rotating member rotates. When the steering wheel further turns to the right, the grooves 34, 36, 38 and 40 of the first rotating member 18 are slowly closed. And then, the grooves 52, 54, 56, 58 of the second rotating member 20 become respectively corresponding to the grooves 102, 104, 106 and 108 of the fourth rotating member 24 to communicate with each. At this point, since each pin 110 and 112 of the fourth rotating member 24 contacts the sides of the grooves 111 and 113 of the second rotating member 20, the first, second and fourth rotating members 18, 20 and 24 integrally rotate.

That is, the first, second and fourth rotating members 18, 20 and 24 rotate simultaneously such that the grooves 115 and 117 of the third rotating member 22 contact the pins 114 and 116, respectively, to rotate with the first, second and fourth rotating members 18, 20 and 24.

If a driver further turns the rotating wheel to the right, the second and third rotating members 20 and 22 which are screw coupled to the cylinder 122 rotate along the screw thread of the cylinder to move upward and downward, thereby providing a steering sensitivity. At this point, the springs 202 and 204 elastically supporting the second and third rotating member, respectively absorb the movement of the rotating members. The bearings 302 and 304 between the upper and lower caps 124 and 30 and the second and third rotating members 20 and 24, respectively, permit the rotating members to smoothly rotate.

Figure 10A:
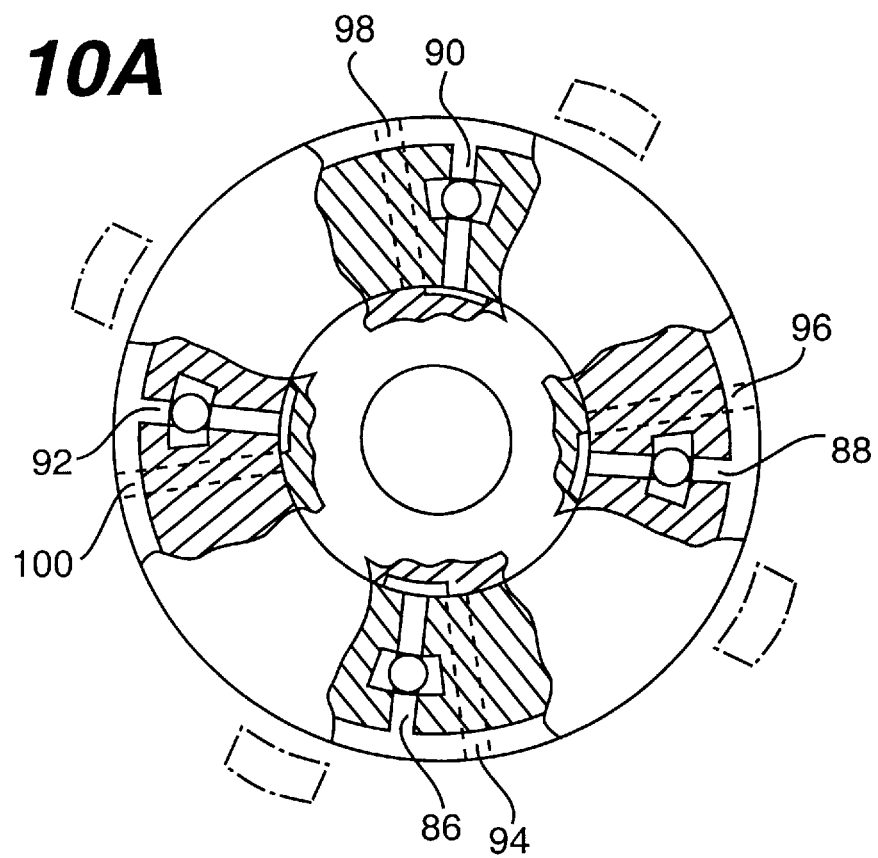
FIG. 10A is a view for showing the formation of the hydraulic passage where the first and second rotating members communicate with each other when the vehicle makes a turn to the right.
Figure 10B:
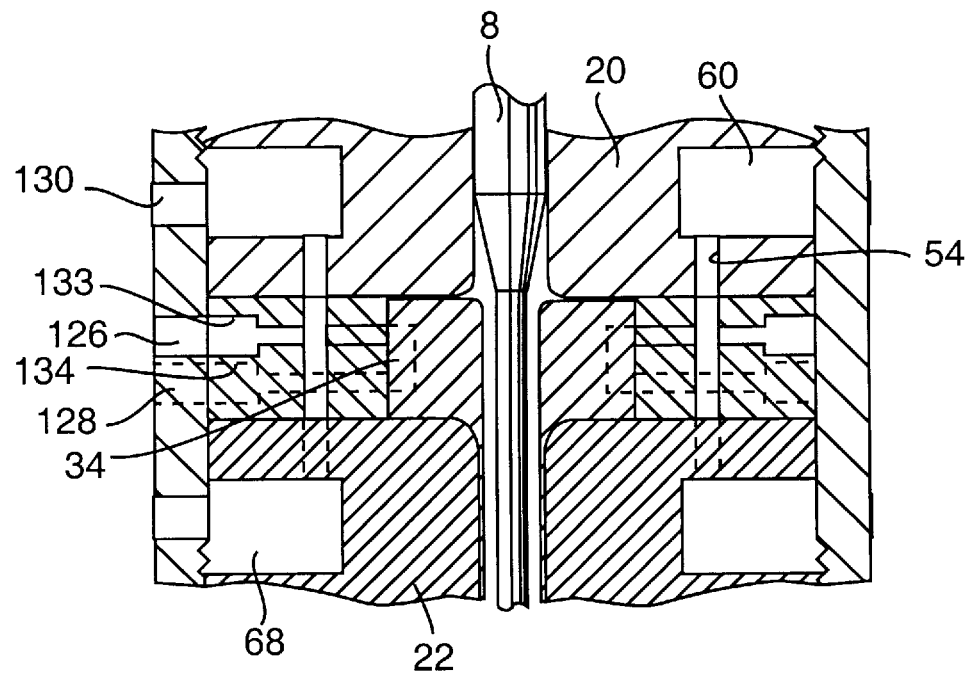
FIG. 10B is a longitudinal view of FIG. 10A.
Figure 11A:
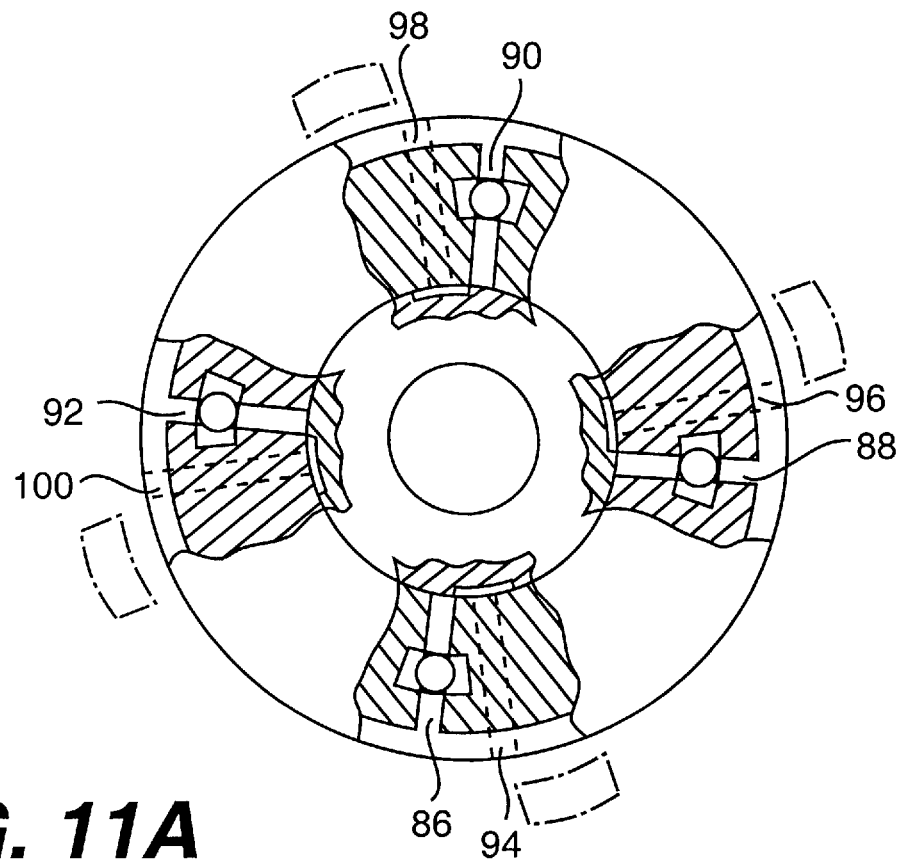
FIG. 11A is a view for showing the formation of the hydraulic passage where the second and fourth rotating members communicate with each other when the vehicle makes a turn to the left.
Figure 11B:
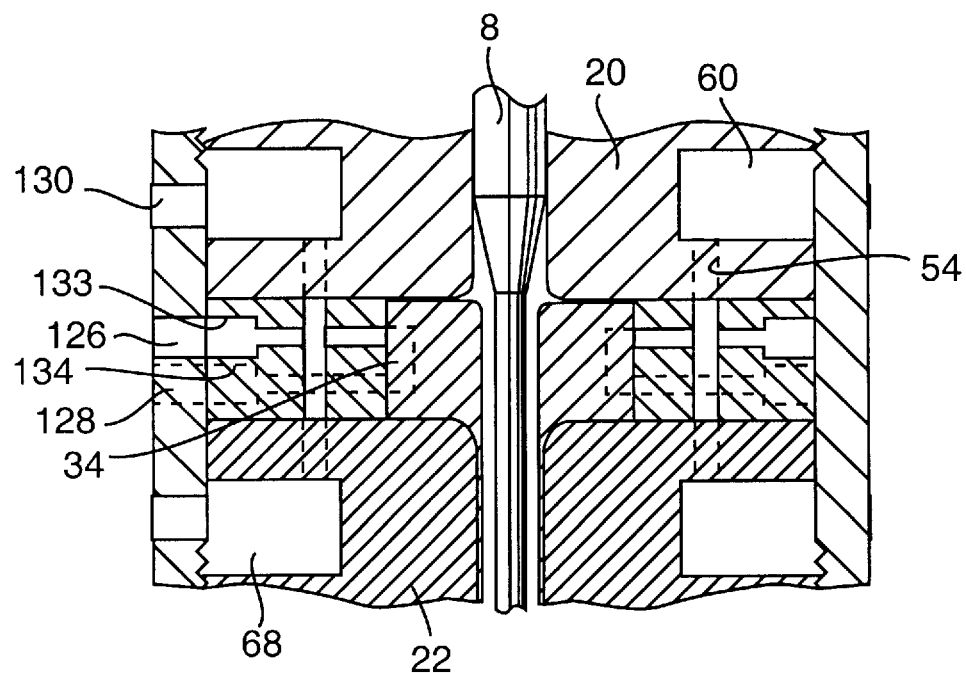
FIG. 11B is a longitudinal view of FIG. 11A.
Figure 12:
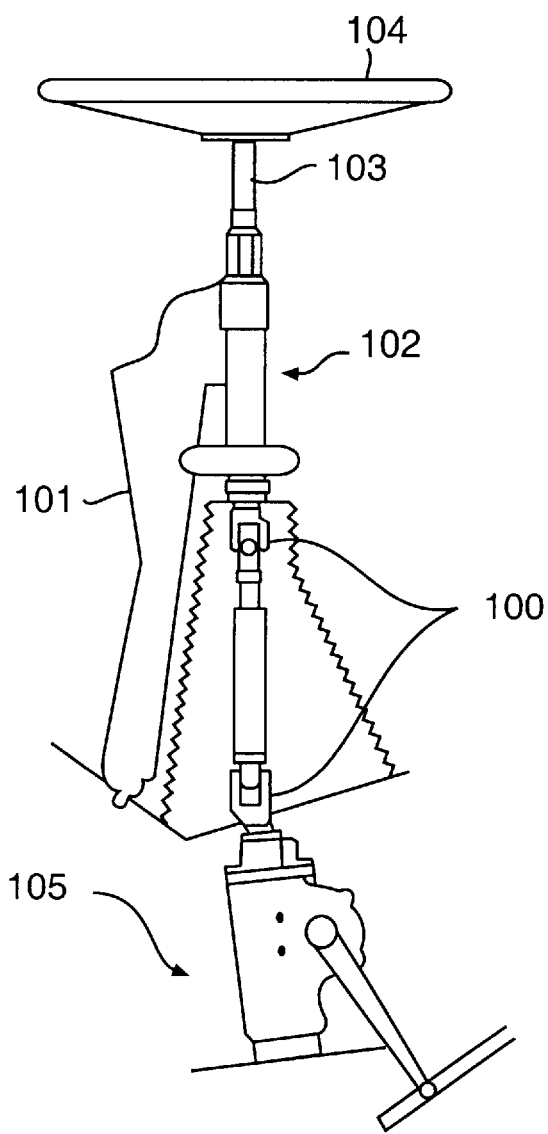
FIG. 12 is a view of a conventional power steering system.

As a result, the second rotating member 20 is more rotated in the steering direction of the steering wheel than the third rotating member 22, such that the vertical passages 102, 104, 106 and 108 become in communication with the passages 52, 54, 56 and 58 of the second rotating member 20 (see FIGS. 10A and 10B).

Further, since the vertical passages 102, 104, 106 and 108 still do not communicate with the vertical passages 70, 72, 74 and 76 of the third rotating member 22, the hydraulic pressure supplied from the oil pump flows into the cylinder 122 through the hole 130 and then flows into the left chamber 150 of the power cylinder 4 along the fluid tube 6a via the vertical passages of the fourth rotating member 24 and the vertical passages of the second rotating member 20.

By this operation, the piston moves rightward in FIG. 8 and rotates the sector gear 158 meshed with the pitman arm 12, thereby making a turn to the left.

As described above, in the steering system of the present invention, since the steering of the vehicle is accomplished without a steering shaft, a space for the driver can be enlarged.

Although preferred embodiments of the present invention have been described in detail hereinabove, it should be clearly understood that many variations and/or modifications of the basic inventive concepts herein taught which may appear to those skilled in the pertinent art will still fall within the spirit and scope of the appended claims.

What is claimed is:

1. A power steering system for a vehicle, comprising:
    a rotatable mounted steering wheel;
    a torsion bar fixed to said steering wheel so as to rotate therewith;
    a hydraulic control unit for controlling a hydraulic pressure from an oil pump in response to a rotation of said torsion bar, said hydraulic control unit being mounted around said torsion bar and comprising:
        a first rotating member for receiving a rotating force from said torsion bar which is inserted into and fixed to a central axle of said first rotating member, an outer circumference of said first rotating member having a plurality of grooves formed thereon;
        a second rotating member located around said torsion bar at an upper side of said first rotating member to receive the rotating force from said first rotating member, an outer circumference of said second rotating member having a channel formed therealong;
        a third rotating member located around said torsion bar at a lower side of said first rotating member to receive the rotating force from said first rotating member, an outer circumference of said third rotating member having a channel formed therealong;
        a fourth rotating member located at an outer circumference of said first rotating member between said second and third rotating members and having a plurality of upper and lower horizontal passages selectively communicating with said plurality of grooves of said first rotating member, and a plurality of vertical passages communicating with said channels of said second and third rotating members, respectively; and
        a cylinder for containing said first, second, third and fourth rotating members, said cylinder having two holes each communicating with a respective said channel of said second and third rotating members; and
    a power cylinder spaced from said torsion bar and receiving the hydraulic pressure from said hydraulic control unit, said power cylinder having a piston meshed with a sector gear which is connected with a pitman arm.

2. The power steering system of claim 1, wherein said upper horizontal passages are angularly indexed to said lower horizontal passages.

3. The power steering system of claim 2, wherein said plurality of grooves of said first rotating member communicate with said upper horizontal passages and said lower horizontal passages of said fourth rotating member when the vehicle is steered straight.

4. The power steering system of claim 2, wherein said plurality of grooves of said first rotating member selectively communicate with said plurality of upper passages and said plurality of lower passages of said fourth rotating member when the vehicle is steered left or right.

5. The power steering system of claim 1, comprising ball members provided on each contacting surface between said first rotating member and second and third rotating members.

6. The power steering system of claim 1, wherein said second and third rotating members each have a plurality of vertical passages, respectively, which selectively communicate with said plurality of vertical passages of said fourth rotating member in response to a steering direction of the vehicle.

7. The power steering system of claim 1, wherein said first rotating member includes a sleeve connected with said torsion bar.

8. The power steering system of claim 1, wherein said power cylinder is provided with intake and exhaust ports and a check valve between said intake and exhaust ports.

9. A power steering system for a vehicle, comprising:
   a hydraulic control unit including:
      a first rotating member which rotates in response to a rotation of a steering wheel;
      second and third rotating members which rotate with said first rotating member simultaneously or in turn; and
      a fourth rotating member for supplying an oil to one of said first, second and third rotating members in response to a rotation of said second and third rotating members; and
   a power cylinder for steering steerable wheels of the vehicle right or left by moving a piston which is connected to the steerable wheels by way of a drag link and a pitman arm, said power cylinder being in hydraulic communication with said hydraulic control unit by two fluid tubes, whereby a movement of the piston is controlled by a hydraulic pressure supplied from said hydraulic control unit.

10. The power steering system of claim 9, wherein said first member comprises a sleeve operatively connected with the steering wheel and includes more than two grooves formed along an outer circumference thereof.

11. The power steering system of claim 9, wherein said second rotating member includes more than two vertical passages, and a channel formed along an outer circumference of said second rotating member and communicating with said vertical passages.

12. The power steering system of claim 9, wherein said third rotating member includes more than two vertical passages, and a channel formed along an outer circumference of said second rotating member and communicating with said vertical passages.

13. The power steering system of claim 9, wherein said fourth rotating member includes a channel for receiving hydraulic pressure from an oil pump, more than two horizontal passages communicating with said channel, and more than two vertical passages communicating with said horizontal passages, said horizontal passages being disposed on upper and lower portions of said fourth rotating member, wherein one said horizontal passage disposed on said upper portion is angularly indexed to one said horizontal passage disposed on said lower portion.

14. The power steering system of claim 9, wherein said power cylinder includes first and second intake ports, first and second exhaust ports, and first and second chambers defined by said piston, such that hydraulic pressure is selectively supplied to one of said first and second chambers by opening one of said first and second intake ports.

15. The power steering system of claim 9, wherein said second rotating member receives the rotating force by a first pin fixed on an upper surface of said first rotating member, said third rotating member receives rotating force by a second pin fixed on a bottom surface of said first rotating member, said first and second pins being received in grooves formed on a bottom surface of said second rotating member and an upper surface of said third rotating member, respectively.

* * * * *